J. S. WASHBURN.
AUTOMATIC BRAKE ADJUSTER.
APPLICATION FILED APR. 1, 1910.
974,005.
Patented Oct. 25, 1910.
3 SHEETS—SHEET 1.
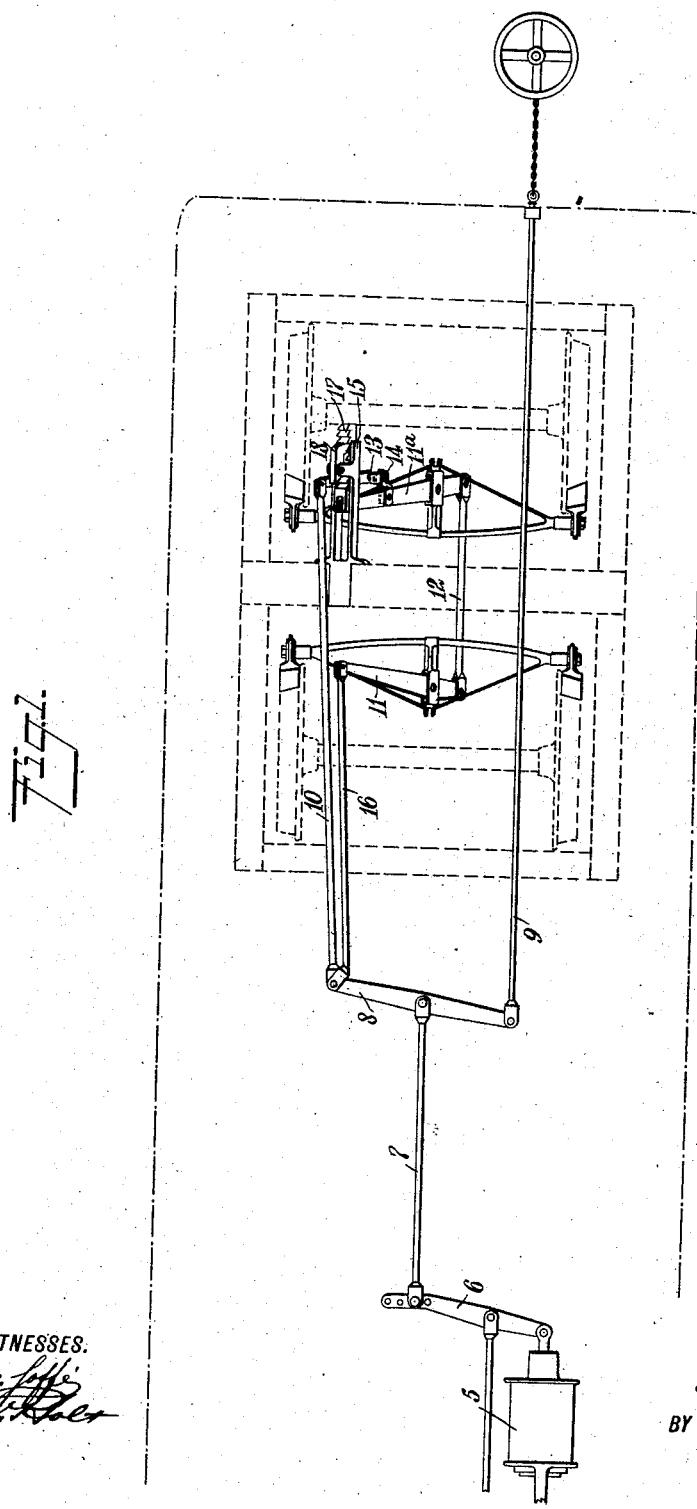
WITNESSES.
INVENTOR
John S. Washburn
BY
ATTORNEYS J. S. WASHBURN.
AUTOMATIC BRAKE ADJUSTER.
APPLICATION FILED APR. 1, 1910.
974,005.
Patented Oct. 25, 1910.
3 SHEETS—SHEET 2.
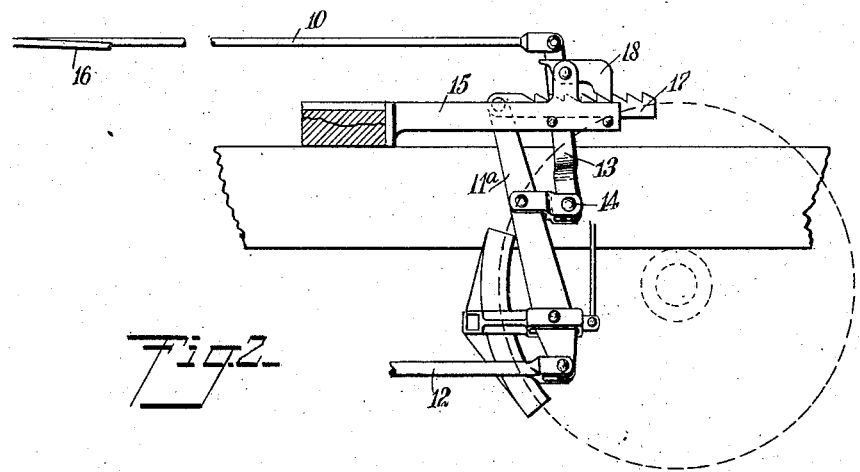
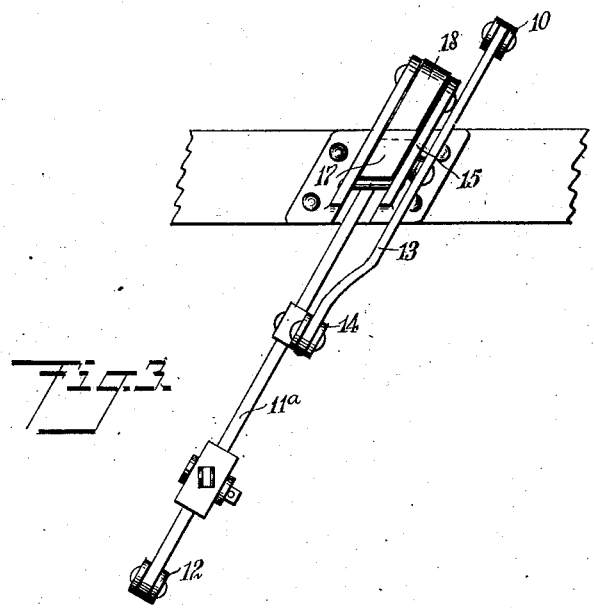
WITNESSES:
INVENTOR
John S. Washburn
BY
ATTORNEYS

J. S. WASHBURN.
AUTOMATIC BRAKE ADJUSTER.
APPLICATION FILED APR. 1, 1910.

974,005.

Patented Oct. 25, 1910.

3 SHEETS—SHEET 3.

WITNESSES:

INVENTOR
John S. Washburn
BY
ATTORNEYS

UNITED STATES PATENT OFFICE.

JOHN S. WASHBURN, OF ALBANY, NEW YORK.

AUTOMATIC BRAKE-ADJUSTER.

974,005.  Specification of Letters Patent.  Patented Oct. 25, 1910.

Application filed April 1, 1910. Serial No. 552,852.

*To all whom it may concern:*

Be it known that I, JOHN S. WASHBURN, a citizen of the United States, and a resident of Albany, in the county of Albany and State of New York, have invented a new and Improved Automatic Brake-Adjuster, of which the following is a full, clear, and exact description.

The invention is an improvement in brake appliances for automatically taking up the slack in car brakes, and has in view a construction in which both brake beam levers constitute live levers and one provided with the adjusting means, each lever being connected to the brake-operating mechanism by a brake rod, with the brake rod of the lever having the adjusting means serving to effect the latter's operation.

The invention further has for its purpose to provide a brake adjuster in which the piston travel of the brake cylinder is substantially unchanged by the wearing away of the brake shoes.

Reference is to be had to the accompanying drawings forming a part of this specification, in which similar characters of reference indicate corresponding parts in all the views.

Figure 4:
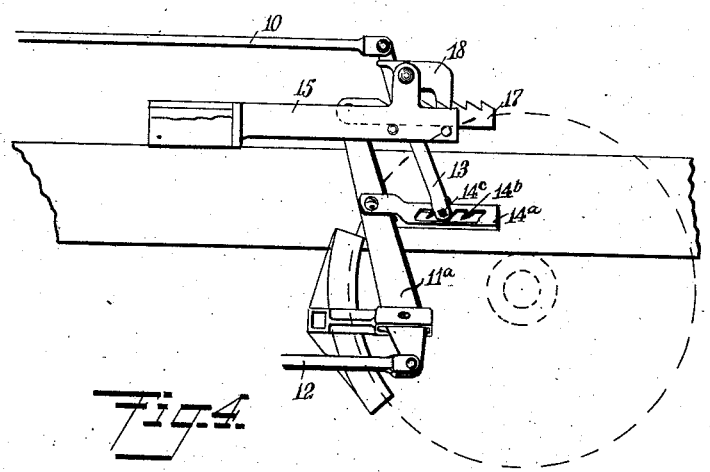

Figure 1 is a plan of a portion of a brake mechanism having a brake adjuster constructed in accordance with my invention; Fig. 2 is a fragmentary vertical section through a truck, showing the adjuster in side elevation; Fig. 3 is an outer end view of the adjuster; Fig. 4 is a view similar to Fig. 2, showing a modification of the construction; and Fig. 5 is a view similar to Fig. 3, showing the modified form of the invention illustrated in Fig. 4.

In Fig. 1 I have shown the outline of a car and its truck having a brake-operating mechanism of well-known construction provided with my improvements, the brake mechanism comprising the customary brake cylinder 5, brake lever 6, connecting rod 7, floating lever 8, hand brake rod 9, brake rod 10, brake beam levers 11 and 11ª, and connecting rod 12, the latter extending between the lower ends of the levers, and the levers fulcrumed intermediate their lengths to the brake beams. The brake rod 10 instead of being directly connected to the upper end of one of the brake beam levers, is indirectly connected to the outer brake beam lever 11ª by a lever 13 and link 14, the link 14 being connected to the lever 11ª intermediate its fulcrum with the brake beam and its upper end, and the lever 13 extending between the link and the brake rod 10 and fulcrumed at an intermediate point to a bracket 15 rigid with the frame of the truck. The other brake beam lever 11 is also directly connected to the brake operating mechanism by a brake rod 16 extending between its upper end and to or near the connection of the brake rod 10 with the floating lever 8, thus both brake beam levers 11 and 11ª constitute live levers.

The outwardly-projecting bracket 15 serves as a guide for slidably retaining a ratchet bar 17, the same being connected to the upper end of the lever 11ª and engaged by a pawl 18, preferably gravity operated, the ratchet bar and the pawl serving to automatically take up the slack in the brake mechanism as the brake shoes are worn, the actuation of the ratchet bar being effected by the brake rod 10.

Figure 5:
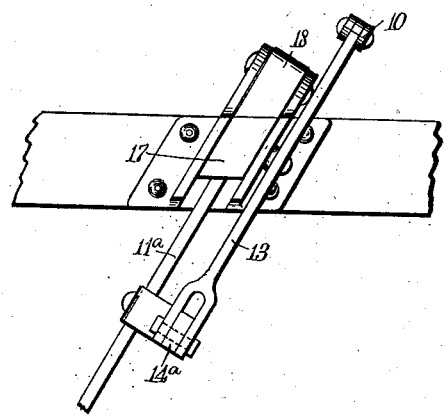

In Figs. 4 and 5 I have shown a further form of the invention, which is in all respects the same as that described except in the matter of the link 14, which is replaced by a slotted link 14ª, having ratchet teeth 14ᵇ at the upper edge of the slot, these teeth being adapted to be successively engaged as the brake shoes wear, by the cross-pin or pawl 14ᶜ at the lower end of the lever 13, this pin passing through the slot of the link. By this construction, the upper end of the lever 11ª is not only adjusted, but the same is adjusted at an intermediate point, which obviously causes the travel of the piston of the brake cylinder to remain substantially constant as the brake shoes wear away.

Having thus described my invention, I claim as new and desire to secure by Letters Patent:

1. The combination of a brake beam lever, a brake-operating mechanism, a ratchet adjusting device to take up the slack in the brake mechanism, operatively connected to the upper portion of the lever, a lever fulcrumed intermediate its length and operatively connected to the brake lever at an intermediate point of the latter, and a brake rod operatively connecting the brake operating mechanism to the last-named lever.

2. The combination of a brake beam lever, a ratchet bar connected to the lever, a brake-operating mechanism, a pawl arranged to engage the ratchet bar, a brake rod connected to the brake-operating mechanism, and a lever fulcrumed intermediate its length and positively connected at one side of its fulcrum to the brake rod and at the opposite side of its fulcrum operatively connected to the brake beam lever intermediate the brake beam and ratchet bar.

3. The combination of a brake beam lever, a pawl and ratchet adjusting device coöperatively arranged with respect to the lever, a brake-operating mechanism, a brake rod connected to said mechanism, and a lever fulcrumed intermediate its length and connected at one side of its fulcrum to the brake rod and at the opposite side of its fulcrum having an adjustable connection with the brake beam lever intermediate the brake beam and pawl and ratchet adjusting device.

4. The combination of a brake beam lever, a ratchet bar connected to the lever, a brake-operating mechanism, a pawl arranged to engage the ratchet bar, a brake rod connected to the brake-operating mechanism, a lever fulcrumed intermediate its length, operatively connected at one side of its fulcrum to the brake rod, and a link having a ratchet take-up, connecting the brake beam lever intermediate the brake beam and ratchet bar, to the last-named lever.

5. The combination of a brake-beam lever, a ratchet adjusting device coöperatively arranged with respect to the upper portion of the lever, a brake-operating mechanism, and a lever fulcrumed intermediate its length and connected at one side of its fulcrum to an intermediate point of the brake-beam lever, and at the opposite side of its fulcrum to the brake-operating mechanism.

In testimony whereof I have signed my name to this specification in the presence of two subscribing witnesses.

JOHN S. WASHBURN.

Witnesses:
  EDWIN W. SANFORD,
  BERTRAM M. AUFSESSER.